C. D. CARTER.
Cultivator.
No. 204,883. Patented June 18, 1878.
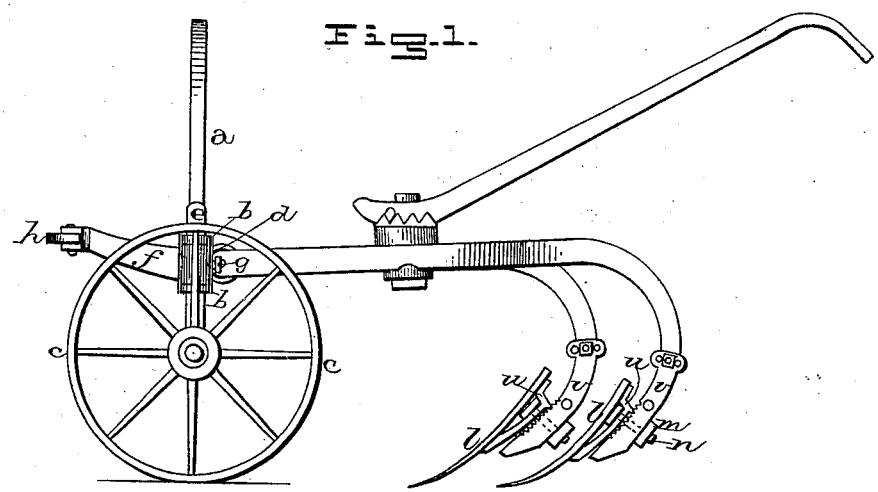
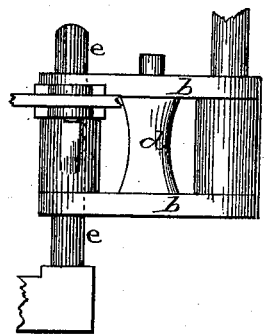
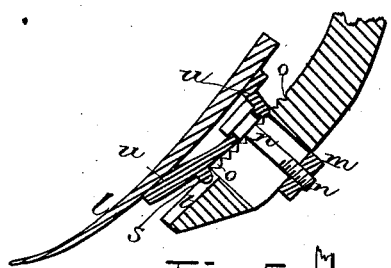
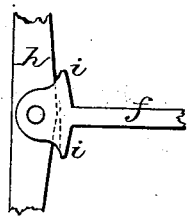
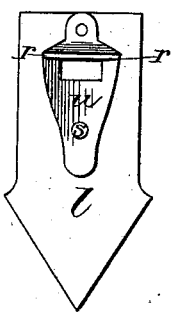
WITNESSES:
Jas. F. DuHamel
W. D. Haines
INVENTOR:
C. D. Carter,
per
J. A. Lehmann,
atty.

UNITED STATES PATENT OFFICE.

CHARLES D. CARTER, OF ALLEGAN, ASSIGNOR OF ONE-HALF HIS RIGHT TO JOHN T. CARTER, OF SPRING ARBOR, MICHIGAN.

IMPROVEMENT IN CULTIVATORS.

Specification forming part of Letters Patent No. 204,883, dated June 18, 1878; application filed May 2, 1878.

*To all whom it may concern:*

Be it known that I, CHARLES D. CARTER, of Allegan, in the county of Allegan and State of Michigan, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in wheeled cultivators; and it consists in the arrangement and combination of parts that will be more fully described hereinafter.

The accompanying drawings represent my invention.

$a$ represents the arched axle, which has its two lower ends passed down through the flat horizontal plates $b$, which project outward toward the wheels $c$. These plates are clamped together by means of a screw-bolt, which passes down through the blocks $d$, to which the beams of the cultivators are pivoted. Passing vertically upward through the outer ends of these bars or plates $b$ are the rods $e$, which extend upward from the axle, and have the supports or draft-bars $f$ clamped thereto by means of set-screws $g$. The spindle upon which the wheel turns and this rod $e$ are made in a single piece, and by means of the set-screw the front ends of the plow-beams can be raised and lowered to any desired height above the ground.

By loosening the set-screw $g$, and raising up on the outer ends of plate $b$, the front ends of the beam will be raised to any desired height, and then, by tightening the screw, the beam will be held in that position. One beam may be made to run higher than the other, or both may run on a level. By having the rear ends of the draft-rods fastened to $e$, between the plates $b$, this adjustment may be nicely regulated.

The draft-bars, which are rigidly clamped to these rods $e$, have their front ends bifurcated, so as to receive the single-trees $h$. The front ends of these draft-bars have the projections $i$ made upon each side, so as to form stops against which the single-trees will strike, and thus prevent them from moving too far in either direction. As these draft-bars are rigidly connected to the rods $e$, and as the single-trees are allowed but a limited movement, it will readily be seen that each wheel is under the direct and immediate guidance of the horse in front of it, and thus the cultivator can be guided with ease and precision. Were the single-trees allowed a free movement this perfect control of the wheels could not be obtained.

To the lower end of each one of the plow-beams is pivoted the sleeve $v$, the upper end of which sleeve is provided with a series of holes, so that it can be adjusted back and forth to suit the angle desired for the shovel. Upon the front edges of these sleeves are formed a number of serrations, $o$, for the upper edge of the shovel-block $u$ to catch in. This shovel-block is rigidly secured to the rear of the shovels $l$, and has a slot through its upper end, through which the clamping-bolt $n$ passes. This bolt passes through the block and back through the sleeve, and receives a nut, $m$, on its rear end. Just above the slot is made the flange $r$, which catches in the serrations in the sleeve, and prevents the block from slipping downward. Upon the rear side of the block, below its level, is formed a stud or projection, $s$, which catches in the groove $t$, formed in the front edge of the lower end of the sleeve, and upon this stud or projection the shovel has a slight rocking or tilting motion.

By the construction above described the shovel is allowed to turn or rock without moving the point of the shovel out of line with the sleeve, which is a very valuable feature in a cultivator.

Having thus described my invention, I claim—

1. The combination of the axle $a$, plates $b$, rigidly secured thereto, plow-beams, upright $e$, passing loosely up through the outer ends of the plates, and draft-bars $f$, fastened to the upright $e$, between the ends of the plates, whereby the front ends of the beams may be raised upward to any desired degree, substantially as shown.

2. The combination of the sleeve $v$, having the serrations $o$ upon its front edge, and a groove, $t$, in its lower front end, with the shovel-block $u$, having the flange $r$, projection $s$, and clamping-screw $n$, substantially as specified.

In testimony that I claim the foregoing I have hereunto set my hand this 27th day of April, 1878.

CHARLES D. CARTER.

Witnesses:
   FRANK E. RICE,
   WM. S. WEBB.